Dec. 2, 1930.                H. E. WHITE                1,783,552
                          PROTECTIVE RELAY
                         Filed Dec. 3, 1926          2 Sheets-Sheet 2
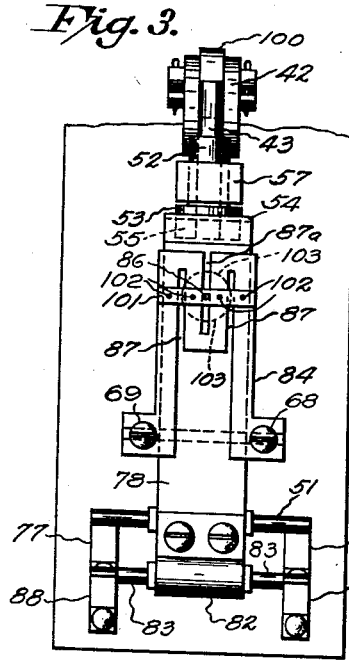
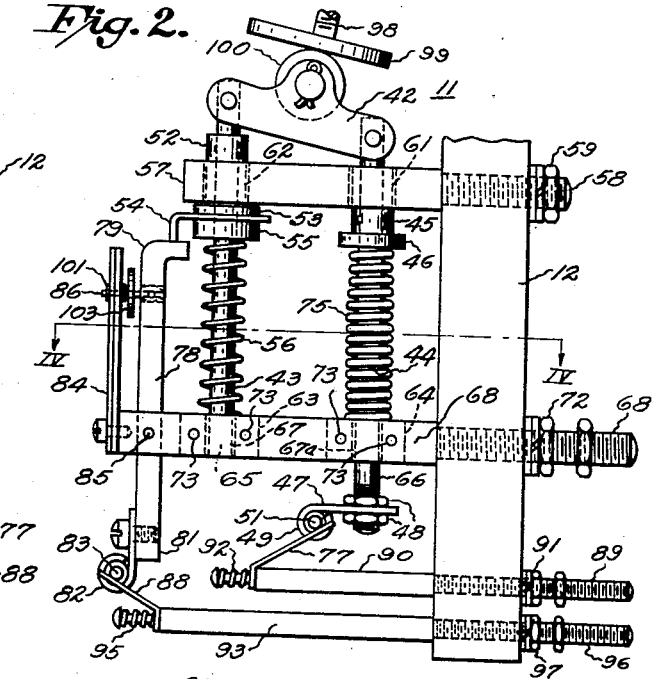
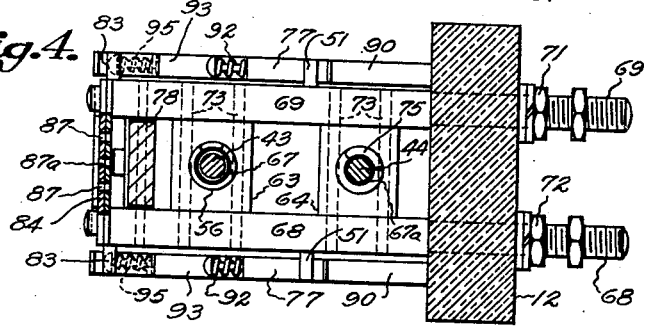
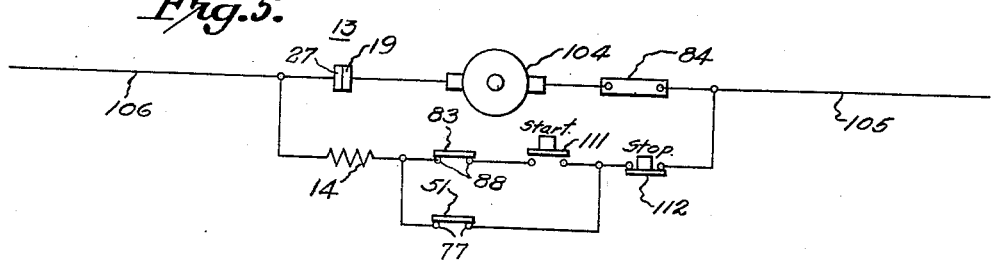
WITNESSES:
INVENTOR
Harold E. White.
BY
ATTORNEY Patented Dec. 2, 1930

1,783,552

UNITED STATES PATENT OFFICE

HAROLD E. WHITE, OF WILKINSBURG, PENNSYLVANIA, ASSIGNOR TO WESTINGHOUSE ELECTRIC & MANUFACTURING COMPANY, A CORPORATION OF PENNSYLVANIA

PROTECTIVE RELAY

Application filed December 3, 1926. Serial No. 152,405.

My invention relates to electric translating devices and particularly to protective relays therefor.

An object of my invention is to provide a protective relay for governing the operation of an electric switch to control an electric-energy translating device, by opening the circuit thereof when the current traversing it reaches a predetermined value.

Another object of my invention is to provide a protective relay for an electric switch which controls an electric energy translating device, that shall be operable to open said switch when the current traversing the translating device has attained a predetermined value and to preclude reclosing of the switch for a predetermined length of time.

Another object of my invention is to provide a thermal protective relay for governing the operation of an electric switch that may be adjusted to govern such operation in accordance with any one particular value of current traversing a translating device controlled thereby.

A further object of my invention is to provide an electro-responsive device for controlling a magnet coil having a starting and a holding circuit that shall cause the holding circuit to be ineffective in response to a predetermined condition of the electro-responsive device.

A further object of my invention is to provide an electro-responsive device for controlling a magnet coil having a starting and a holding circuit that shall cause the starting circuit to be ineffective, in response to a predetermined condition in a device to be controlled for a predetermined length of time.

And a further object of my invention is to provide a protective relay that shall be simple and rugged in construction and easily manufactured.

In practicing my invention, I provide a main switch for controlling such electric energy translating devices as electric motors, and a magnet coil for causing the switch to be actuated to its circuit-closing position upon energization thereof. The magnet coil is provided with the usual starting and holding circuits. An overload electro-responsive relay is provided for governing the starting and holding circuits in accordance with given conditions.

In the preferred form of my invention, the protective relay is responsive to the condition of a current-traversed bimetallic element that is effective, when an overload exists in the device to be protected, to break the holding circuit and, at the same time, to render the starting circuit ineffective for a predetermined period of time.

At the end of the above mentioned period of time, the starting circuit is automatically returned to its effective condition. The switch cannot, therefore, during this period, be closed until the starting circuit is caused to be again effective by means of the protective relay.

By means of my invention, it is possible to prevent a motor, or any other electrical device which has been subjected to an overload, from being energized by maintaining the starting circuit energized, because the starting circuit is controlled by an overload electro-responsive element, for rendering it ineffective for a period of time necessary to allow the motor to cool.

In the accompanying drawings,

Fig. 2 is a view, in side elevation, of a portion of the device illustrated in Fig. 1, Fig. 3 is a view, in front elevation, of the portion of the device illustrated in Fig. 2, Fig. 4 is a view, in horizontal lateral section, taken on the line IV—IV of Fig. 2 and, Fig. 5 is a diagrammatic view of the device embodying my invention as applied to an electric motor.

Figure 1:
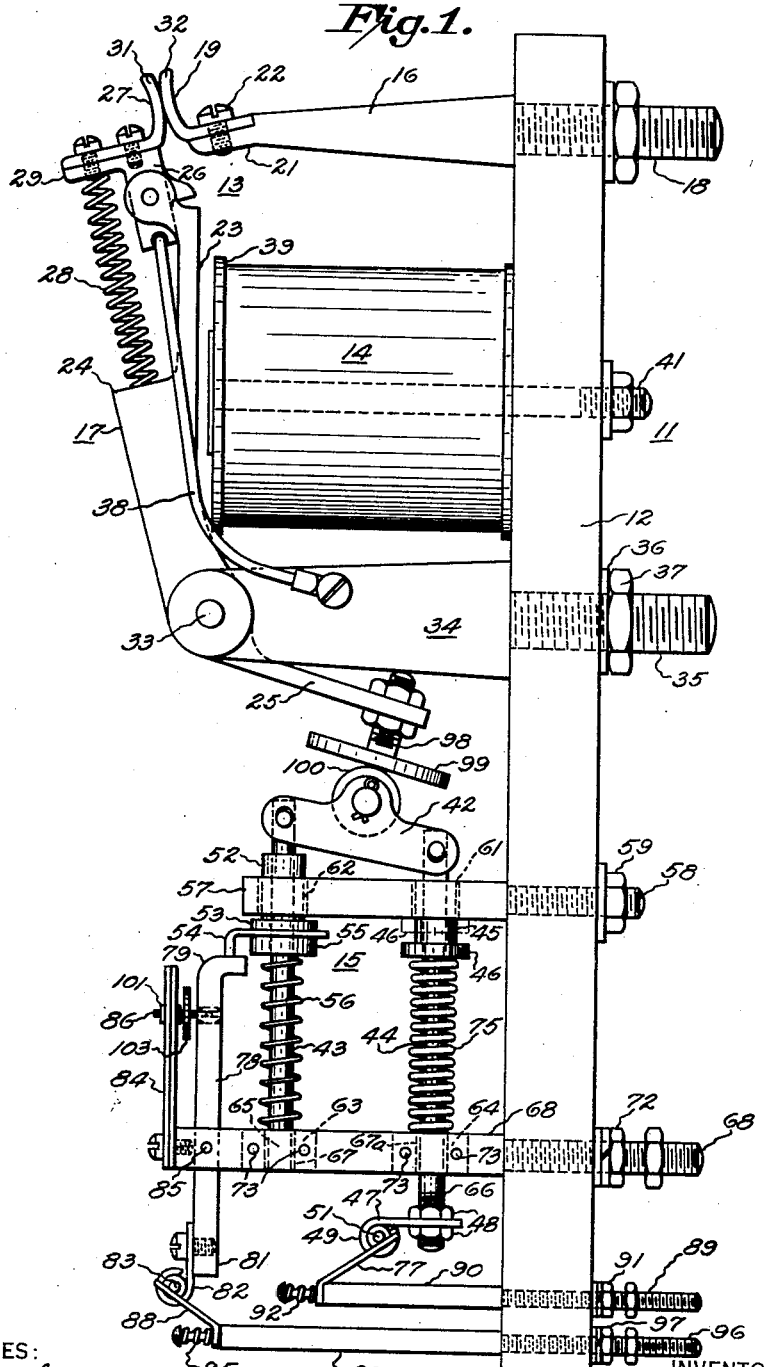
Fig. 1 is a view, in side elevation, of a device embodying my invention.

In Fig. 1 of the drawings, is illustrated a circuit-controlling device 11 which comprises a base 12, a main switch 13 mounted thereon, a magnet coil 14 for controlling the main switch and a protective relay 15 for governing the magnet coil 14.

The switch 13 comprises a stationary contact-member support 16 and a movable contact-member support 17. The stationary contact-member support 16 is suitably secured to the base 12 by means of a screw-threaded end portion 18 thereof that projects to the rear of the base 12 and constitutes one terminal of the switch 13. A contact member 19, of arcuate shape, is mounted at the end 21 of the member 16 and is secured thereto by a screw 22.

The movable contact-member support 17 is of substantially L-shape and comprises a portion 23 that is provided with a shoulder portion 24 and a portion 25 that extends at an angle to the portion 23.

An angle piece 26 is carried at the end of the portion 23 and is pivotally secured thereto by any suitable means. A contact member 27 is secured to the angle piece 26 by any suitable means and has a portion of arcuate form that is adapted to engage the contact member 19.

A compression spring 28 is disposed between a portion 29 of the angle piece 26 and the shoulder portion 24 and serves to maintain the contact member 27 in positive engagement with the contact member 19, substantially as illustrated in Fig. 1 of the drawings. The spring 28 operates also to bring the tips 31 and 32 of the contact members 19 and 27 into engagement just before they are actuated to a disengaged position.

The movable contact-member support 17 is pivotally secured at 33 to the forward end of a terminal member 34. The terminal member 34 is secured to the base 12 by means of a screw-threaded end portion 35, a lock washer 36 and a nut 37.

A shunt conductor 38 is secured to the terminal member 34 and to the angle piece 26 and serves to carry substantially all of the current traversing contact members 19 and 27.

The movable contact-member support 17 is maintained in the position illustrated in Fig. 1 by the magnet coil 14. The magnet coil 14 is secured to the base 12 by means of an end plate 39 and a bolt 41 that extends coaxially therethrough and through the base 12.

The magnet coil 14 is controlled by the protective relay 15 which comprises a rockable bar 42 that is pivotally connected, at its ends, to a pair of depending rods 43 and 44. The upper end of rod 44 is provided with a bushing 45 that has an annular flange 46 at one end thereof. The bushing 45 is suitably secured to the member 44 to move therewith.

The lower end of the rod 44 has a contact-carrying sheet-metal member 47 mounted thereon and secured thereto by means of nuts 48. The front end of the member 47 is provided with a return-bent portion 49 in which is carried a contact-bridging member 51 that is suitably insulated therefrom.

A bushing 52 is carried by, and suitably secured to, the upper end of the rod 43 and is provided with an annular flange 53. An angle piece 54 is carried between the annular flange 53 and a cooperating clamping piece 55. The clamping piece 55 is maintained in positive engagement with the angle piece 54 by means of a relatively weak spring 56.

A guide member 57 is secured to the base 12 by means of a screw-threaded end portion 58 and a nut 59. The guide member 57 is provided with apertures 61 and 62 in which the bushings 45 and 52 may move freely. A pair of laterally-extending guide members 63 and 64 are provided (see Fig. 4), in which the end portions 65 and 66 of the rods 43 and 44 may move freely by reason of apertures 67 and 67a therein.

The guide members 63 and 64 are suitably secured to a pair of current-carrying members 68 and 69 that are secured to the base 12 by means of nuts 71 and 72. It is to be noted that the members 68 and 69 are spaced apart by means of the guide members 63 and 64. The guide members 63 and 64 are preferably made of electric insulating material and are suitably secured to the members 68 and 69 by means of pins 73 that extend therethrough.

A relatively strong spring 75 is disposed around the rod 44 and between the insulating guide member 64 and the annular flange 46 of the bushing 45. The spring 75 is of such strength that it tends to bias the annular flange 46 towards the guide 57 and, when the movable contact member 17 has been moved to such position that the contact members 27 and 19 are out of engagement with each other, the annular flange 46 is actually in engagement with the support 57, as is indicated by the broken lines in Fig. 1 of the drawings. When the flange 46 is in the position illustrated by the broken lines, the contact-bridging member 51 is moved out of engagement with a pair of cooperating contact members 77.

A thermally controlled bar 78 is disposed between the current-carrying members 68 and 69 and is pivotally secured thereto. An angle portion 79, at the upper end thereof, serves to hold the angle piece 54 substantially in the position illustrated in Figs. 1 and 2 of the drawings. A portion 81 of the member 78 extends below the current-carrying members 68 and 69 and has a contact-carrying member 82 secured thereto. A contact-bridging member 83 is carried by the member 82 and is suitably insulated therefrom.

A bimetallic member 84 is electrically connected and secured to the ends of the current-carrying members 68 and 69 and serves to actuate the member 78 about its pivot point 85 by means of an adjustable screw-threaded member 86 that connects the bimetallic member 84 and the member 78. The bimetallic member 84 is provided with longitudinally extending slots 87 and 87a for the purpose of providing a relatively long conductor, as compared with its lateral dimensions.

By means of the adjustable screw-threaded member 86, the bimetallic member 84 may be moved either to the right or to the left of the particular position illustrated in Fig. 1 of the drawings.

The contact-bridging member 83 carried by the member 82 is normally maintained in engagement with a pair of stationary contact members 88.

The contact members 77, hereinbefore referred to, are carried at the ends of a pair of current-conducting members 90 that are suitably secured to the base 12 by means of screw-threaded end portions 89 and nuts 91. Springs 92 are carried at the ends of the members 90 and serve to bias the contact members 77 towards the position illustrated in Figs. 1 and 2 of the drawings.

The stationary contact members 88 are carried at the ends of a pair of terminals 93 and are resiliently secured thereto by means of springs 95. The current-carrying terminal members 93 are extended through the base 12 and are secured thereto by means of screw-threaded end portion 96 and nuts 97.

In Figs. 1 to 3 of the drawings, the contact-bridging member 51 is illustrated as being in engagement with the stationary contact members 77. When in this position, the spring 75 is maintained in compression by means of a screw-threaded member 98, carried by the portion 25 of the contact member 17, and a circular flange 99 mounted at one end thereof.

When the movable contact member 17 is in the position illustrated in the drawings, the annular flange 99, carried by the member 98, is moved into engagement with a roller 100, carried by the rockable bar 42 which, in turn, compresses the spring 75 and actuates the rod 44 downwardly, thereby actuating the contact-bridging member 51 into engagement with the stationary contact members 77. It is to be noted that, when the spring 75 is under compression, the angle portion 79 of the member 78 is maintained in engagement with the angle piece 54, thereby preventing compression of the spring 56 that is disposed concentrically around the rod 43.

When the current traversing the bimetallic member 84 is of such value as to cause substantial heating thereof, the angle piece 54 becomes disengaged from the angle portion 79 of the member 78. The spring 75, being stronger than the spring 43, is therefore, released to cause the spring 56 to be compressed. By this operation, the contact-bridging member 51 is disengaged from the stationary contact members 77. It is also to be noted that, when the member 78 has been actuated about its pivot point 85, the contact-bridging member 83 is also actuated out of engagement with the stationary contact members 88.

Upon the disengagement of the contact-bridging member 51 from the stationary contact members 77, the coil 14 is deenergized and permits the movable contact member 17 to be actuated by gravity to such position that the contact members 19 and 27 are out of engagement and the flange 99 of the member 98 is actuated out of engagement with the rockable bar 42. When the member 99 is out of engagement with the rockable bar 42 the springs 56 and 75 are effective to actuate the annular flanges 46 and 53 of the bushings 45 and 52, respectively, into engagement with the guide member 57.

Upon cooling of the bimetallic member 84, the member 78 is actuated in a clockwise direction about its pivot point 85 until the angle portion 79 thereof is moved under the angle piece 54 and the contact-bridging member 83 is in operative engagement with its co-operative stationary contact members 88. Upon energization of the magnet coil, the spring 75 is again compressed until the contact-bridging member 51 is in engagement with the contact members 77.

The screw-threaded member 86 projects through an insulating bushing 101 that extends across the bimetallic member 84 and is suitably secured thereto by rivets 102. The other end of the screw-threaded member 86 has flexible screw-threaded engagement with the member 78. By turning a wheel 103, carried by the member 86, in the proper direction, the bimetallic member 84 may be caused to assume any initial position desired for altering the thermal characteristics of the relay 15.

The relay 15 may be so regulated that it is operable to deenergize the magnet coil 14 at any desired overload by adjusting the angle piece 54. The angle piece 54 may be so constructed that it may be moved either to the right or the left of its position illustrated in Figs. 1 and 2. If it is moved to the left, a larger overload will be required to so energize the member 84 that the portion 79 of the member 78 is actuated out of engagement therewith. If it is moved to the right, a smaller overload will be sufficient.

While I have illustrated an electro-responsive element in the form of a bimetallic member 84 for actuating the member 78 out of engagement with the angle piece 54 and for actuating the contact-bridging member 83 carried at one end thereof out of engagement with the contact members 88, I may employ other electro-responsive devices suitable for producing the same result, for example, I may employ an electromagnet coil that is energized in accordance with the current flowing in a translating device to be protected or other similar means suitable for the purpose.

In Fig. 5 of the drawings, I have illustrated, schematically, the application of the device embodying my invention to the protection of such electric translating devices as electric motors, and it is believed that its operation may best be explained with reference thereto. A motor 104 may be connected to a suitable source of electromotive force by means of conductors 105 and 106 and a line or a main switch including the contact members 19 and 27 therefor. The electro-responsive element 84 is connected in circuit with the motor 104. An electromagnet coil 14 is provided for actuating the main switch 13 to a circuit-closing position, substantially as illustrated.

The magnet coil is provided with a starting or temporary energizing circuit which comprises conductor 106, coil 14, a contact-bridging member 83, a starting switch 111, a stop switch 112 to conductor 105. The holding circuit of the magnet coil 14 comprises conductor 106, coil 14, a contact-bridging member 51, the stop switch 112 and conductor 105.

Assuming that the main switch is in its circuit-opening position, the motor 104 may be energized by closing the starting switch 111, thereby completing the hereinbefore described starting circuit. Upon the closing of the main switch 13, the contact-bridging member 51 is actuated into substantially the position illustrated in Fig. 5 of the drawings, thus establishing the holding circuit previously described herein.

Upon energization of the overload electro-responsive element 84 by a long continued overload, the angle piece 79 of the member 78 will be disengaged from the angle piece 54, thereby causing the spring 75 to be released by reason of the fact that the spring 56 will be compressed. When the spring 75 is released, the contact-bridging member 51 is disengaged from the stationary contact members 77. The holding coil 14 is thereby deenergized, and the main switch 13 is actuated to its open-circuit position, thus effecting deenergization of the motor 104.

Since the contact-bridging member 83 has been actuated out of the starting circuit, the holding coil cannot be energized by closing the starting switch 111 until the electro-responsive element 84 has cooled sufficiently to cause the portion 79 of the member 78 to re-engage the angle piece 54, and the contact-bridging member 83 to re-engage its cooperating stationary contact members 88.

The starting circuit is now rendered effective, and the coil 14 may be energized by closing the starting switch 111. Upon the closing of the switch 13, in response to the energization of the coil 14, the contact-bridging member 51 is again caused to close the holding circuit so that the starting switch 111 may be released to its open-circuit position without deenergizing the coil 14.

It is to be noted that, so long as the spring 56 is not restrained in substantially the position illustrated in Figs. 1 and 2 of the drawings by engagement of the member 78 and the angle piece 54, the starting circuit cannot be closed. Therefore, if the motor 104 has been caused to increase in temperature, as a result of an excessive overload, it must be permitted to cool for a certain length of time, depending upon the temperature-time lag of the thermo-responsive element 84, before it can be again energized to assume its load.

The circuit connections in the device illustrated in Fig. 1 of the drawings for the thermal element 84 will be from the stationary contact member 16 through the contacts 19 and 27, shunt 38, supporting member 34, current-carrying member 69, bimetallic member 84 and current-carrying member 68.

By my invention, I have provided a switch for controlling an electric translating device that is actuated to its circuit-closing position by means of an electromagnet coil. The electromagnet coil is provided with a starting, or temporary energizing circuit, and a holding or permanent energizing circuit, which circuits are controlled in accordance with overload conditions from which the motor is to be protected by means of a relay that is responsive to the overload. When the relay is energized in accordance with a certain overload condition of the motor, it operates to deenergize the holding circuit of the magnet coil, thus causing the switch to be actuated to its circuit-opening position and to thereby deenergize the motor.

A switch is provided in the starting circuit of the magnet coil that is controlled by the overload-responsive element in order that, when the overload condition occurs, the starting circuit is opened and is caused to remain open for a certain period of time so that the motor cannot be energized until it has been allowed to remain in a no-load condition for such certain period of time. Until the over-load responsive element has returned to its normal condition, the starting circuit of the magnet coil cannot be closed by holding the starting switch in its closed position.

Various modifications may be made in the embodiment of my invention illustrated. I desire, therefore, that only such limitations shall be placed thereon as are imposed by the prior art and the appended claims.

I claim as my invention:

1. The combination with a switch for controlling a motor, a magnet coil for actuating the switch, a starting and a holding circuit for said magnet coil, each circuit including relatively movable and stationary contact members, means for effecting yielding engagement of the contact members of the holding circuit by closing movement of the switch, means including a current-traversed bimetallic element in electric circuit with the motor for effecting engagement of the contact members of the starting circuit, and means including a latch actuated by the bimetallic element for effecting disengagement of the contact members of the holding circuit upon predetermined overload conditions in the motor.

2. The combination with a switch for controlling a motor biased to its open position, a magnet coil for holding the switch in its closed position, a starting and a holding circuit for said magnet coil, each circuit including relatively movable and stationary contact members, means including a current-traversed bimetallic member in electrical circuit with the motor and a pivoted bar for holding the contact members of the starting circuit in engagement during normal operating conditions of the motor, and means including a pair of rods, springs thereon and a latch on one of said rods normally operatively engaging said bar for effecting engagement of the contact members of the holding circuit by a closing movement of the switch and disengagement of the contact members of the holding circuit upon movement of the bimetallic member and the bar in accordance with predetermined overload conditions of the motor.

In testimony whereof, I have hereunto subscribed my name this 19th day of November, 1926.

HAROLD E. WHITE.